No. 855,548. PATENTED JUNE 4, 1907.
C. H. WILLIAMS.
PHOTOMETER.
APPLICATION FILED NOV. 24, 1905.

WITNESSES:
A. F. Hood
M. A. Atwood

INVENTOR:
Charles H. Williams
By his Att'y.
Henry W. Williams

UNITED STATES PATENT OFFICE.

CHARLES H. WILLIAMS, OF MILTON, MASSACHUSETTS.

PHOTOMETER.

No. 855,548.  Specification of Letters Patent.  Patented June 4, 1907.

Application filed November 24, 1905. Serial No. 288,898.

*To all whom it may concern:*

Be it known that I, CHARLES H. WILLIAMS, a citizen of the United States, residing in Milton, in the county of Norfolk and State of Massachusetts, have invented a new and useful Improvement in Photometers, of which the following is a specification.

This invention relates to that class of photometers intended for use in measuring the intensity, the relative intensities or the relative illuminating power of terrestrial lights, and it is designed more particularly to measure the amount of light coming from a distant signal; to compare white, red, green, yellow, or other lights with each other as to their photometric value; to measure electric lights in a building or elsewhere, without removing them from their receptacles, for the purpose of ascertaining whether they are falling below their standard of brightness; to ascertain the candle-power of gas-lights; to compare terrestrial lights with a standard fixed value based on stellar magnitudes; and in general to produce a compact and accurate standard instrument for the measurement of terrestrial lights.

In carrying out my invention, I employ a developed photographic plate on which is a film increasing in density from one end to the other, such a plate not being new in itself considered, as it has been used in astronomical measurements at the Harvard Observatory in Cambridge, Massachusetts. I provide this plate (which is much longer than it is wide) with a suitable frame furnished with a handle at one end, and inclose it in a case of similar shape, in which the plate is adapted to slide but is prevented from complete separation therefrom. The case is provided on its opposite sides with coincident or registering holes through which the light to be tested is viewed by the eye, and on its front side with another opening through which a graduated scale on the plate is rendered visible. One end of the plate is provided with a sliding removable cover provided at its outer end with a loop or bail of shape to fit transversely over or around the case and hold the cover at right angles with that end of the case which is nearer the holes. The cover when in this position operates as an eye-guard or shade and is held therein preferably by means of a spring which also operates as a stop to prevent the plate from dropping out of or being drawn from the case.

The nature of the invention is fully described below, and illustrated in the accompanying drawing, in which:—

Figure 1:
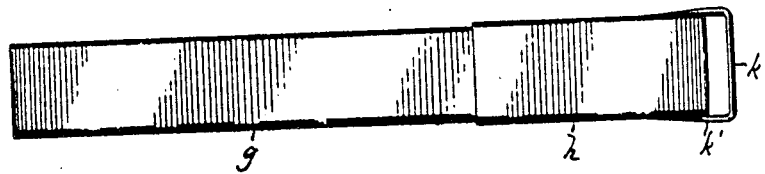
Figure 2:
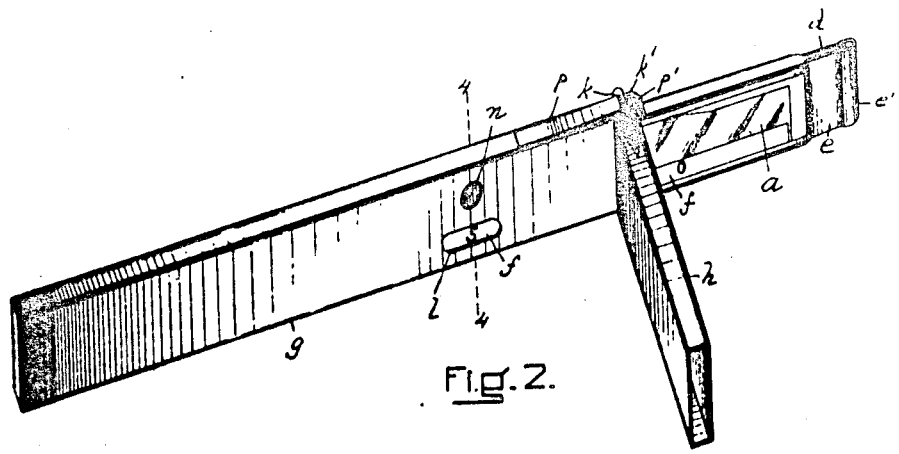
Figure 3:
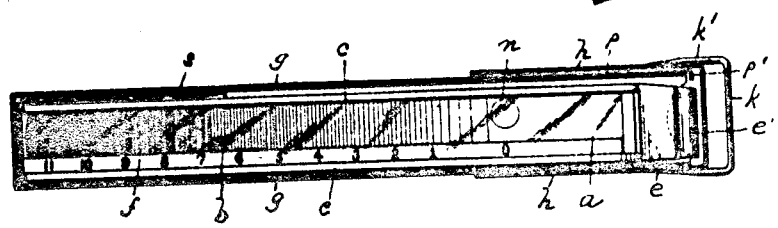
Figure 4:
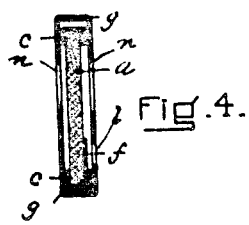

Figure 1 is a front elevation of my photometer with the cover in position thereon and extending over the holes or openings in the case. Fig. 2 is a perspective view of the photometer as it appears in actual use, the cover being in position to operate as an eye-guard. Fig. 3 is a longitudinal vertical section of the device with the parts in the position indicated in Fig. 1. Fig. 4 is a cross vertical section taken on line 4—4, Fig. 2.

Similar letters of reference indicate corresponding parts.

$a$ represents a developed photographic plate provided with a film $b$ which increases in density from one end toward the other (the drawing indicating the increase of density as being toward the left) said plate being preferably long and narrow, and being furnished with a suitable metallic frame $c$. The right end of this plate is provided with a handle $d$ of any suitable construction, adapted to extend a little from that end of the case—the handle illustrated consisting merely of a metallic fold $e$ thickened or rounded at its outer end as shown at $e'$. The lower edge of the framed plate has secured to it adhesively, or in any suitable manner, a narrow strip $f$ provided with a suitable scale. This framed developed photographic plate is inclosed slidingly in a case $g$ corresponding in shape to the plate, said case being open at its right end, and provided at that end with a sliding removable cover $h$, closed at its right end, and furnished at that end with a staple-shaped bail or loop whose outer portion $k$ is preferably straight and at a distance from the right end of the cover which corresponds substantially with the thickness of the case $g$, said portion $k$ being connected with the top and bottom edges of the cover $h$ by means of the legs $k'$.

The case is provided with three holes or apertures, viz., a hole $l$ in the front wall of the case as it is used, said hole being preferably somewhat elongated, and registering with the scale $f$: and two coincident or registering holes $n$ in the front and rear walls, opposite the film $b$ on the plate, and directly

BEST AVAILABLE COPY above the center of the hole $l$. A spring $p$ has one end secured to the top edge of the case, and its free end $p'$ extends toward the right and down over the end of the case and bears normally on the upper edge of the frame $c$ of the plate. On said edge of the frame there is secured a small stop-bead $s$ near the inner end of the plate, which by striking the hooked end $p'$ of the spring, prevents the plate from falling out of or being drawn inadvertently from the case.

In practical operation, when the instrument is to be used for any of the purposes hereinbefore recited, the cover $h$ is removed from the position illustrated in Fig. 1, and its bail $k, k'$ is slipped over the right end of the case, being held firmly in position by the spring $p$, in which position the cover extends at right angles from the case and is substantially flush with the right end thereof, as shown in Fig. 2. The photometer case is then held horizontally before the eyes, resting on the nose, and the coincident openings $n$ are brought before the right or left eye (as preferred) of the observer, the eye being shaded at the end next the holes $n$ by said cover. The light to be measured is then brought into the field of view, as near the center of the field as practicable, and the case is so held as to keep this light in the field during the test. With the hand of the side corresponding to the eye used, the glass photometric plate is slowly withdrawn from the case, and as it is withdrawn the thickness of the photographic film $b$, as it appears between the holes $n$, increases in density, and the light appears to gradually diminish until it finally disappears. The moment the light is extinguished by the film, the hand releases the photometric plate which is held in position by the down-turned end $p'$ of the spring $p$, the instrument is removed from the face, and the scale $f$ indicates through the opening $l$ the point of extinction on the film for that light. By testing another light in the same manner and reading the scale, comparative values of the two lights can be easily determined.

In practice, the instrument is made of convenient size and shape to be easily carried in the pocket, and it is so simple in construction and use that those who are unaccustomed to scientific instruments can measure signal, electric, gas and other terrestrial lights without difficulty, and with results which will compare favorably in photometric value with those produced by more expensive instruments.

It is evident that the case may be reversed, the plate drawn from its left end, and the cover applied to the same end, if desired, and the openings $l$ and $n$ located near the left instead of the right end.

Having thus fully described my invention, what I claim, and desire to secure by Letters Patent, is:—

1. In a photometer, a developed photographic plate provided with a film increasing in density from near one end toward the other; a scale on said plate; a case adapted to hold said plate but allow it to slide in the line of direction of the increase of density in the film, said case being provided with coincident holes in its walls on opposite sides of the plate, and with an opening opposite the scale; a cover adapted to be applied to one end of the case; and a bail or loop extending from the outer end of the cover, and of shape to embrace the case and hold said cover at an angle thereto when the photometer is in use, for the purpose set forth.

2. In a photometer, a developed photographic plate provided with a film increasing in density from near one end toward the other; a scale on said plate; a case adapted to hold said plate but allow it to slide in the line of direction of the increase of density in the film, said case being provided with coincident holes in its walls on opposite sides of the plate, and with an opening opposite the scale; a cover adapted to be slid over the open end of the case; a bail or loop extending from the closed end of the cover and adapted to embrace the case and hold said cover at substantially right angles thereto when the photometer is in use; and a spring secured to the case and extending when the cover is thus applied, between the case and the bail and bearing on the plate, thereby preventing accidental relative movement of the plate and case and of the case and cover, for the purpose set forth.

In testimony whereof I have signed my name to this specification in the presence of two subscribing witnesses.

CHARLES H. WILLIAMS.

Witnesses:
HENRY W. WILLIAMS,
A. K. HOOD.